United States Patent
Madsen et al.

(10) Patent No.: US 11,460,000 B2
(45) Date of Patent: Oct. 4, 2022

(54) WIND TURBINE BLADE COMPRISING A ROOT END STRUCTURE WITH AN ADAPTIVE POSITIONING OF THE PULTRUDED ELEMENT

(71) Applicant: LM Wind Power International Technology II ApS, Kolding (DK)

(72) Inventors: Kristian Lehmann Madsen, Kolding (DK); Henrik Barslev, Kolding (DK); Thomas Møller, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 0 days.

(21) Appl. No.: 16/756,611

(22) PCT Filed: Oct. 18, 2018

(86) PCT No.: PCT/EP2018/078519
§ 371 (c)(1),
(2) Date: Apr. 16, 2020

(87) PCT Pub. No.: WO2019/077027
PCT Pub. Date: Apr. 25, 2019

(65) Prior Publication Data
US 2020/0263658 A1    Aug. 20, 2020

(30) Foreign Application Priority Data
Oct. 18, 2017 (EP) ..................................... 17197093

(51) Int. Cl.
*F03D 1/06* (2006.01)
*F03D 13/10* (2016.01)

(52) U.S. Cl.
CPC ........... *F03D 1/0675* (2013.01); *F03D 13/10* (2016.05)

(58) Field of Classification Search
CPC ...... F03D 1/0675; F03D 13/10; F03D 1/0658; Y02P 70/50; Y02E 10/72; B29D 99/0025; B29C 70/885; B29C 70/86
See application file for complete search history.

(56) References Cited

U.S. PATENT DOCUMENTS 4,915,590 A * 4/1990 Eckland ................ F03D 1/0658
416/225
7,163,378 B2 * 1/2007 Kildegaard ........... B29C 70/525
416/230
(Continued)

FOREIGN PATENT DOCUMENTS

EP    3121441 A1    1/2017
WO   03057457 A1    7/2003
(Continued)

*Primary Examiner* — Ryan J. Walters
(74) *Attorney, Agent, or Firm* — Nath, Goldberg & Meyer; Jerald L. Meyer; Tanya E. Harkins

(57) ABSTRACT

This invention relates to a root end structure, a wind turbine blade comprising such a root end structure and a method of manufacturing such a wind turbine blade. The root end structure comprises a plurality of fastening members distributed along a root end of a blade part, wherein a plurality of pultruded elements are arranged in between the fastening members. Each pultruded element has a second side surface facing a first side surface of an adjacent fastening member. Gaps are formed between the first and second side surfaces in at least the thickness direction, wherein the gaps enable an adaptive positioning of the pultruded elements relative to the outer layers during the vacuum assisted resin infusion process.

14 Claims, 7 Drawing Sheets

(56) References Cited

U.S. PATENT DOCUMENTS

| | | | | |
|---|---|---|---|---|
| 9,970,304 B2* | 5/2018 | Caruso | .................. | B29C 66/72 |
| 10,060,411 B2* | 8/2018 | Caruso | .................. | F03D 1/0658 |
| 2015/0233260 A1* | 8/2015 | Garm | .................. | F03D 80/70 |
| | | | | 416/204 A |
| 2016/0312762 A1* | 10/2016 | Quiring | .................. | B29C 70/34 |
| 2017/0022825 A1* | 1/2017 | Caruso | .................. | B29C 70/86 |
| 2020/0332762 A1* | 10/2020 | Jalmer | .................. | B29C 70/86 |

FOREIGN PATENT DOCUMENTS

| | | |
|---|---|---|
| WO | 2014041151 A2 | 3/2014 |
| WO | 2015004257 A1 | 1/2015 |

\* cited by examiner

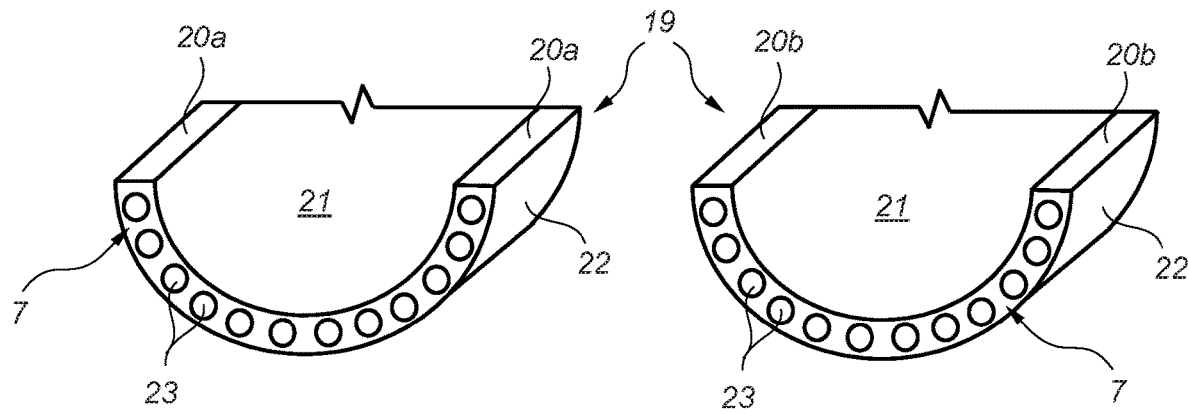
Fig. 3
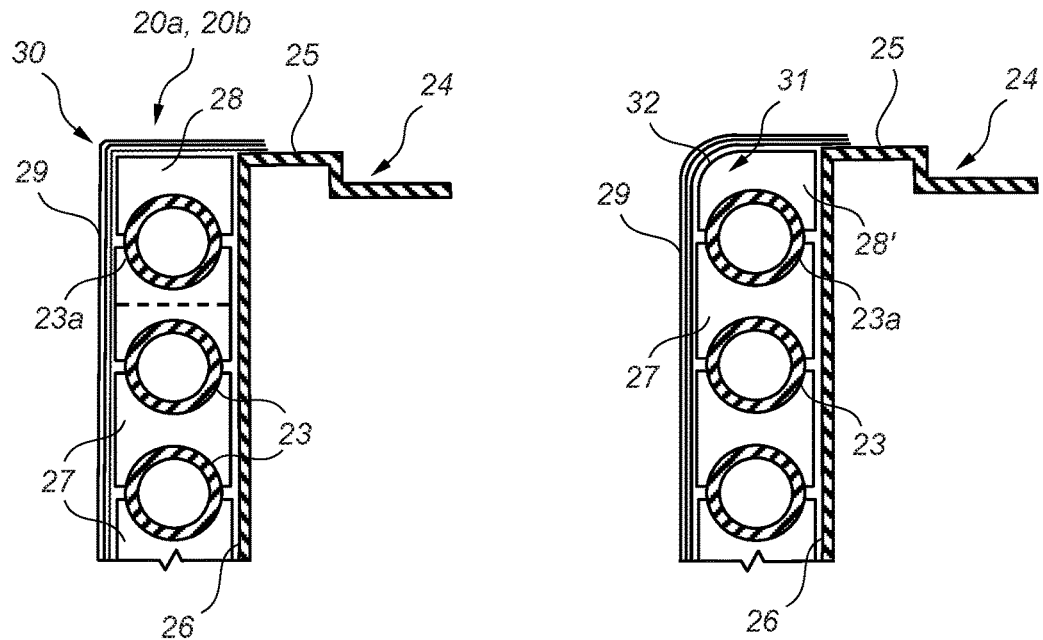
Fig. 4 - prior art
Fig. 5
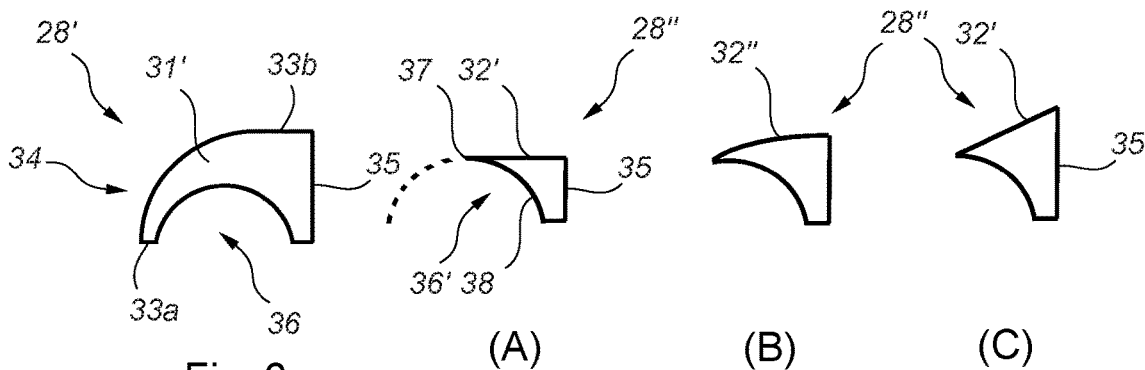
Fig. 6
(A) (B) (C)
Fig. 7

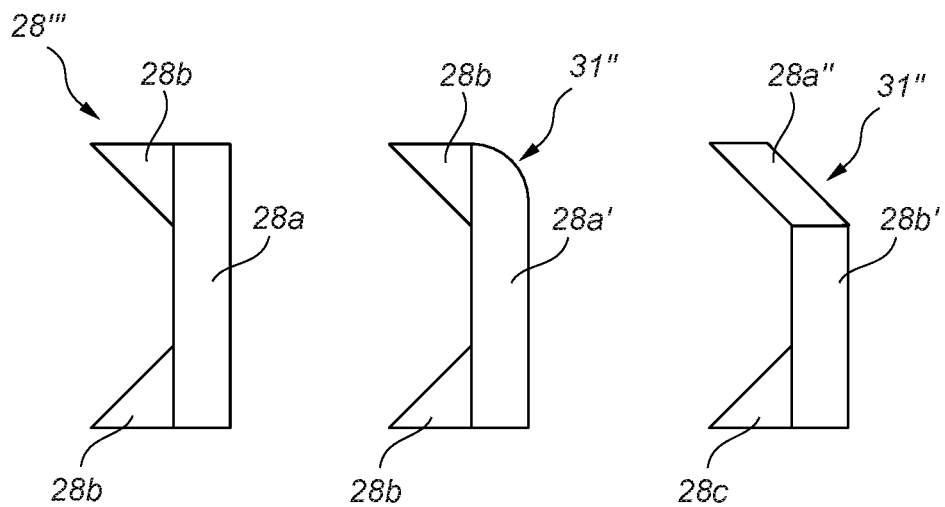
Fig. 8
(A)  (B)
Fig. 9
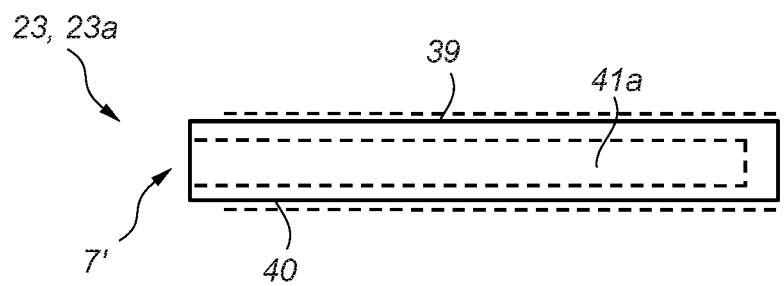
Fig. 10
Fig. 11
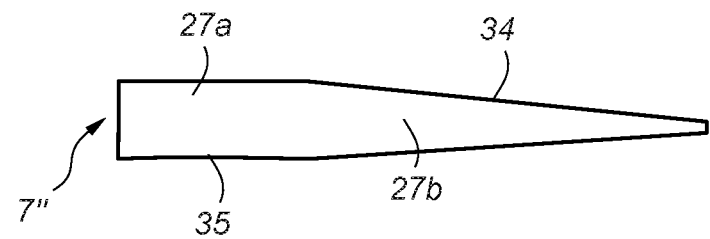
Fig. 12

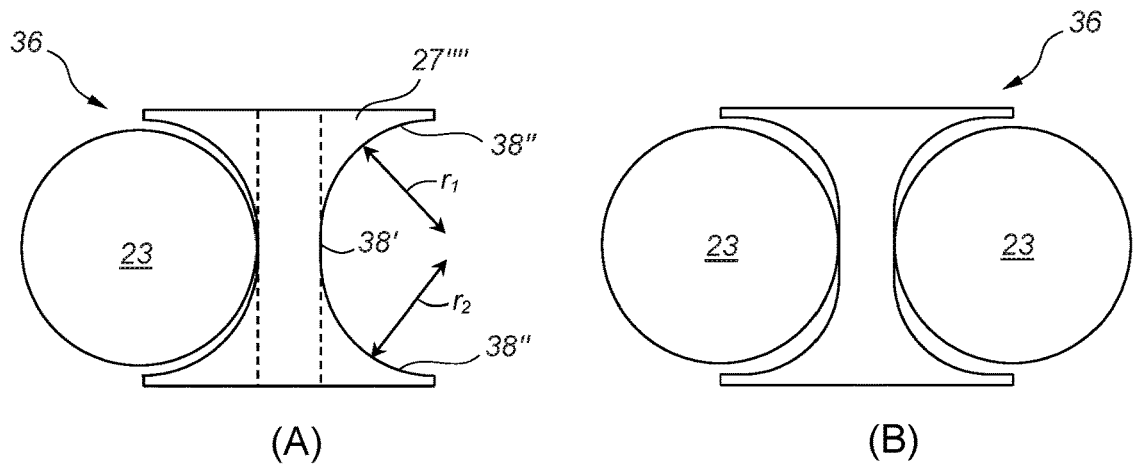
Fig. 16
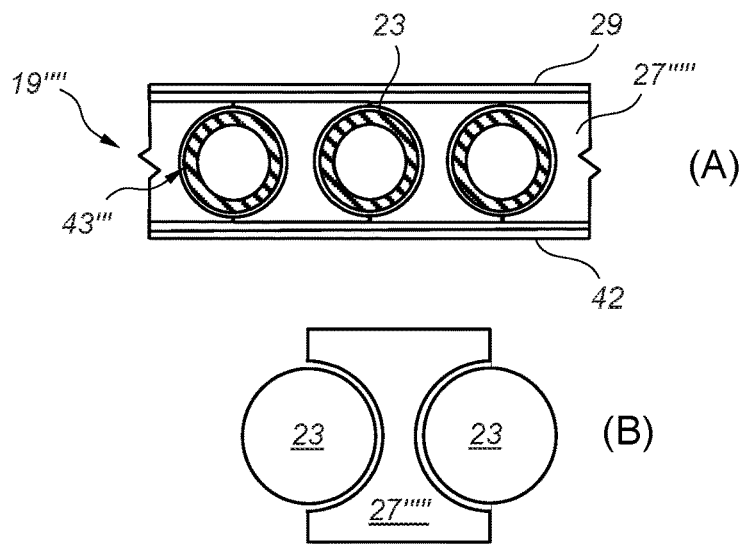
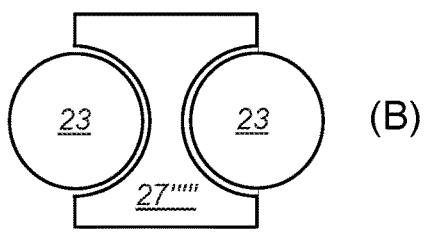
Fig. 17
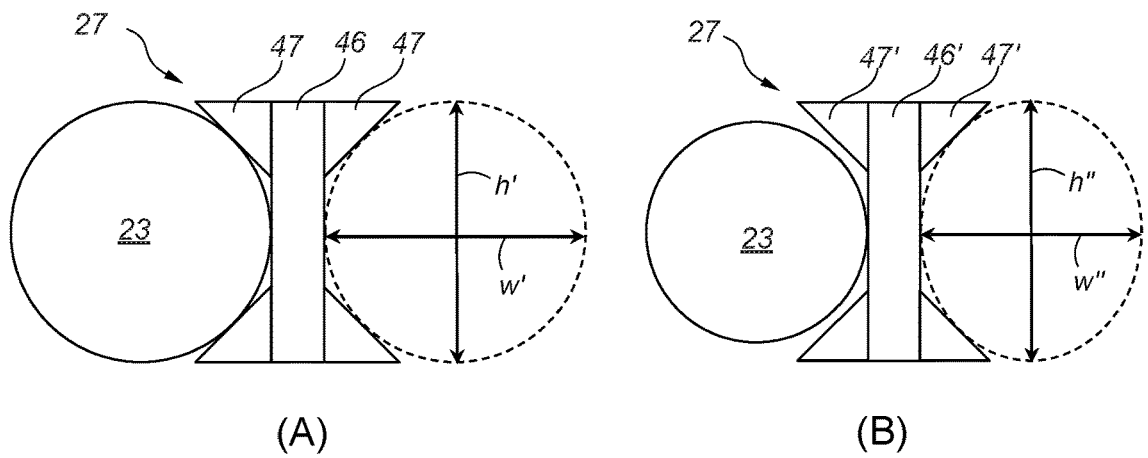
Fig. 18

WIND TURBINE BLADE COMPRISING A ROOT END STRUCTURE WITH AN ADAPTIVE POSITIONING OF THE PULTRUDED ELEMENT

This is a National Phase Application filed under 35 U.S.C. 371 as a national stage of PCT/EP2018/078519, filed Oct. 18, 2018, an application claiming the benefit of European Application No. 17197093.2, filed Oct. 18, 2017, the content of each of which is hereby incorporated by reference in its entirety.

TECHNICAL FIELD

The present invention relates to a root end structure comprising a plurality of fastening members and a plurality of pultruded elements arranged in between each fastening member, wherein the fastening members and the pultruded elements are sandwiched between inner and outer layers of a fibre material.

The present invention further relates to a wind turbine blade comprising such a root end structure, and a method of manufacturing such a wind turbine blade.

BACKGROUND

The root end of wind turbine blades is manufactured by laying up a number of layers of a fibre material inside a mould to form an outer skin. A plurality of fastening elements is then positioned relative to the mould and the fibre layers, wherein the individual fastening elements are connected to a root end plate holding them in place during manufacturing. A plurality of retaining members is afterwards positioned between the individual fastening members. Further layers of the fibre material are laid up over the fastening and retaining members to form an inner skin. The structure is then enclosed by a bag material and resin is introduced using vacuum infusion. The resin is finally cured to form a first wind turbine blade. A second wind turbine part is manufactured in a similar manner, after which the two wind turbine blade parts are attached together.

The bushings are fixed relative to the mould and are thus not able to move during the infusion process. The retaining elements are normally help in place by a firm and tight contact with the bushings. Movements in the inner or outer skin may occur during the vacuum infusion, which could lead to a longitudinal misalignment between the retaining members and the outer skin as the retaining elements are also not able to move. This may in turns lead to wrinkles in the transitional skin area at the end of the retaining elements, which will adversely affect the structural performance of the root end.

US 2015/0233260 A1 discloses such a root end configuration where bushings and butterfly shaped wedge elements are arranged between an inner skin and an outer skin. Various cross-sectional shapes of the bushings are disclosed. Each wedge element has a local inner surface and a local outer surface and opposite facing local side surfaces, wherein the local side surfaces have a profile corresponding to the profile of the local side surfaces of the bushings. The wedge elements have a local thickness that is at least 10% greater than the width. This forms a tight fit and thereby prevents any relative movement between the bushings and the wedge elements.

US 2013/0111752 A1 discloses a root end configuration comprising a plurality of bushings distributed evenly along a semi-circular shaped root end structure, wherein rovings are arranged between the individual bushings. Each roving element extends partly along the length of the bushings and contacts opposite facing side surfaces of the adjacent bushings. The inner surface of each bushing is in direct contact with inner layers of a fibre material extending along the inner surface of the root end structure. Further, the outer surface of each bushing is in direct contact with outer layers of a fibre material extending along the outer surface of the root end structure. The outer layers of fibre material extend along a moulding surface and further along a mould edge surface. The inner layers of fibre material extend along the inner surface and a free facing side surface of the uppermost bushings and further along the mould edge surface. The uppermost bushings only contact the adjacent roving elements at the opposite side surface. The uppermost bushings thus form a transitional contact surface for laying up the layers of the inner skin over the mould edge.

US 2013/0285284 A1 discloses a root end configuration comprising a plurality of root end sections each comprising bushings spaced apart by spacer elements. The spacer element comprises a butterfly shaped portion extending along the length of the bushings and a wider wedge shaped portion extending beyond the bushings in the lengthwise direction. The spacer element has opposite facing local side surfaces which contact corresponding local side surfaces of the adjacent bushings. The bushings have a greater outer diameter than the local thickness of the spacer element, wherein the local side surfaces of each spacer element have a curved profile so that it conforms to the curved profile of the greater bushings in order to form a tight fit. This prevents any relative movement between the bushings and the spacer elements.

OBJECT OF THE INVENTION

An object of the invention is to provide a root end structure, a wind turbine blade and a method of manufacturing such a wind turbine blade that overcomes the above-mentioned problems.

Another objection of the invention is to provide a root end structure, a wind turbine blade and a method of manufacturing such a wind turbine blade that reduces the risk of wrinkles forming in the transitional area between the inner and outer skins.

A further object of the invention is to provide a root end structure, a wind turbine blade and a method of manufacturing such a wind turbine blade that increases the flexibility during positioning of the retaining elements.

DETAILED DESCRIPTION OF THE INVENTION

One object of the invention is achieved by a root end structure of a wind turbine blade, the root end structure extending from a blade root into a root end portion of a blade shell formed by at least one blade part having an inner surface, an outer surface and at least one blade joint edge, the root end structure comprises a plurality of fastening members distributed along the root end of said at least one blade part in a circumference direction, each fastening member has a first inner side, a first outer side and opposite facing first sides each extending in the longitudinal direction, wherein a first pultruded element is arranged between at least one pair of fastening members and, optionally, a second pultruded element is arranged between an outermost fastening member and a blade joint edge of the at least one blade part, each of the first and second pultruded elements has a second inner side, a second outer side and opposite facing second sides further extending in the longitudinal direction, wherein a first side surface of said fastening member forms a circumscribed profile having a first width and a first height, and a second side surface of said first and second pultruded elements forms an inscribed profile having a second width and a second height, the inscribed profile being a substantial elliptical profile, wherein said inscribed profile has a first width-to-height ratio and said circumscribed profile has a second width-to-height ratio, the second width-to-height ratio being different from the first width-to-height ratio, and/or said inscribed profile and said circumscribed profile have a height ratio between 0.8 and 0.95 so that the first pultruded element is able to move relative to the adjacent fastening members during vacuum assisted resin infusion.

This provides an improved root end structure reducing the risk of wrinkles forming in the transitional area between the inner and outer skins of the blade shell. This also increases the flexibility when positioning the pultruded elements which is advantageous when evacuating the root end structure during the resin infusion process. This allows the pultruded elements to conform to the shape of the outer skin, thereby preventing any longitudinal misalignment between the pultruded elements and the outer skin. This also reduces time and costs for repairing wind turbine blades having a blade length of at least 50 metres.

The fastening members, e.g. bushings, are held in a fixed longitudinal position relative to the outer layers forming the outer skin. This may be achieved by temporary mounting the bushings to a root end plate which is then attached to or positioned relative to the root end of the mould. The root end plate may be mounted or fixed directly to the blade mould, or held in place relative to the blade mould by a moveable support structure. This temporary mounting means that the bushings are not able to move relative to the outer skin and thus they are not able to conform to the outer layers during evacuation.

The retaining members, e.g. the pultruded elements, are sandwiched between an inner skin and the outer skin defining the inner and outer surfaces of the blade shell, respectively. The inner skin may be formed by a number of inner layers of a fibre material. The outer skin may be formed by a number of outer layers of the same fibre material or a different fibre material. The fibre material may include fibres made of glass, carbon, aramid or any combinations thereof. Each skin may comprise two, three, four or more individual layers formed as mats, stripes or rovings.

Each bushing has a local first inner side facing the inner skin and a local first outer side facing the outer skin. Each bushing further has opposite facing local first sides extending between the local inner and outer sides. Similarly, each pultruded element has a local second inner side facing the inner skin and a local second outer side facing the outer skin. Each pultruded element further has opposite facing local second sides extending between the local inner and outer sides. The bushing and the pultruded element each has a local thickness measured between the inner and outer sides and a local width measured between the two first or second sides. The exterior surface of the bushings may include corrugations or notches, or simply a continuous planar surface.

A pultruded element, i.e. first pultruded element, is arranged between each pair of adjacent bushings. An outermost pultruded element, i.e. second pultruded element, may be arranged at one or both blade joint edges of the blade part, wherein each outermost pultruded element is positioned adjacent to an outermost bushing facing that blade joint edge. The bushings may thus be sandwiched between individual pultruded elements. Alternatively, the outermost pultruded element may be omitted so that outermost bushing is arranged at the blade joint edge.

The inner skin may extend over this outermost bushing or pultruded element and further along a mould edge surface during the lay-up process. The inner and outer skin may be trimmed off at the respective blade joint edges in a later step, e.g. before or after curing of the resin, to form the respective blade joint interfaces.

The first pultruded element has a recess formed in both local second sides, wherein each recess is configured to receive an opposite facing local first side of an adjacent bushing.

The second pultruded element may have a similar recess formed in only one local side, wherein this recess is configured to receive an opposite facing local side of the outermost bushing.

The first side surface forms a first profile, e.g. a circumscribed profile, in the width direction defining a first width and a first height. The first profile defines the shape of the outer surface of the bushing. The first width is measured along the minor radius of this circumscribed profile. The first height is measured along the major radius of this circumscribed profile.

The second side surface of the recess is formed by one or more surface portions that together define a second profile, e.g. an inscribed profile, in the width direction. The inscribed profile contacts each respective surface portion in a vertex and defines a second width and a second height. The second width is measured along the minor radius of this circumscribed profile. The second height is measured along the major radius of this circumscribed profile.

Further, the first and second side surfaces may have a height ratio between 0.8 and 0.95 so that at least one gap is formed between the first and second side surfaces. The gap may transform from a maximum radial distance to a minimum radial distance in the second circumference direction. The gap may be partly or fully filled with a fibre material, e.g. wrapped around the bushing, which may be impregnated with resin during the resin infusion process. The gaps allow for an adaptive positioning of the first pultruded element as it is able to move relative to the adjacent bushings during the vacuum assisted resin infusion process. Wrinkles in the fibre layers can thus be avoided.

The first and second side surfaces may be in direct contact with each other along one or more contact areas or lines, thus forming one or more individual gaps arranged adjacent to these contact areas or lines. This allows the relative movement in the width direction to be restricted.

The abovementioned gap or gaps may also be formed by the inscribed profile and the circumscribed profile having different width-to-height ratios. The circumscribed profile may thus have a first height being smaller than the second height and/or a first width being smaller than the second width. The pultruded elements and bushings thereby have non-complementary shaped sides, and thus gap(s) are formed between the first and second side surfaces. This also allows for an adaptive positioning of the first pultruded element during the vacuum assisted resin infusion process, and thus wrinkles in the fibre layers can be avoided.

According to one embodiment, said first and second side surfaces further has a width ratio between 0.8 and 1.

The first and second side surfaces may further have a width ratio between 0.8 and 1, preferably between 0.9 and 0.95, so that the second width is greater than the first width. This allows a variable or uniform gap to be formed between the first and second side surfaces. The gap may be partly or fully filled with a fibre material, as mentioned above. This allows for an adaptive positioning of the first pultruded element, as mentioned above.

According to one embodiment, said inscribed profile has a first width-to-height ratio between 0.9 and 0.995.

The second side surface may have an elliptical or substantially elliptical shaped inscribed profile with a width-to-height ratio between 0.9 and 0.995. In conventional root structure designs, the second side surface has a circular inscribed profile which has a width-to-height ratio of 1. In the present invention, the second height is thus greater than the second width. This allows for the use of non-complementary bushing designs, meaning that a tight fit is not formed between the first and second side surfaces.

The first and second side surfaces may have the same overall profile, e.g. a substantial elliptical profile, but different width-to-height ratios. The first profile may have a first width-to-height ratio and the inclined profile may have a second width-to-height ratio. For example, the first width-to-height ratio may be greater than the second width-to-height ratio, or vice versa. For example, the first width-to-height ratio may be equal to the second width-to-height ratio. Alternatively, the first and second side surfaces may have the same overall profile, but different heights and widths.

According to one embodiment, said first pultruded element has a substantial butterfly shaped cross-sectional profile in the width direction.

The recesses may extend along the local second sides so that the first pultruded element has a butterfly shaped cross-sectional profile. The butterfly profile may extend along the entire length of the pultruded element, or along a portion thereof. The butterfly shaped portion may have a uniform thickness and/or height. This provides an optimal transfer of loads between the wind turbine blade and the rotor hub.

The inner surface of the first pultruded element may have a planar or curved inner surface extending in the width direction and/or in the lengthwise direction. Further, the outer surface of the first pultruded element may have a planar or curved outer surface extending in the width direction and/or in the lengthwise direction. The curvatures of the inner and outer surfaces may be determined according to the root end design, the dimensions of the bushings and the pultruded elements.

According to one embodiment, at least one of the first and second pultruded elements is formed as a single continuous piece or by a number of sub-pieces arranged relative to each other.

The first pultruded element and/or the second pultruded element may be formed as a single continuous element extending in the length direction. This reduces the total number of item needed for manufacturing the root end structure and allows for a simplified lay-up process.

The first pultruded element and/or the second pultruded element may also be formed by a number of sub-pieces arranged relative to each other. The sub-pieces together may form a substantial butterfly shaped cross-sectional profile in the width direction. This allows for an alternative lay-up process.

For example, the first pultruded element may comprise at least two sub-pieces arranged symmetrical relative to each other. The sub-pieces may be arranged back-to-back or front-to-front to form the butterfly shaped cross-sectional profile.

For example, the respective pultruded element may comprise a first sub-piece and at least one set of second sub-pieces. The first sub-piece may have a rectangular cross-sectional profile. The second sub-pieces may each have a substantial triangular shaped cross-sectional profile. The second sub-piece may be positioned on one side surface of the first sub-piece at the local inner side. Further, another second sub-piece may be arranged on the opposite side surface of the first sub-piece. Alternatively or additionally, another second sub-piece may be arranged at the local outer side. The first and second sub-pieces together may form the butterfly shaped cross-sectional profile.

According to one embodiment, the fastening member and/or at least one of said sub-pieces are wrapped in a fibre material along at least a part of the length of the fastening member or the at least one sub-piece.

The inner and outer sides and the opposite sides of the bushing may together form the exterior surface. The exterior surface may be a continuous planar surface extending in the length direction. The bushing may thus have a constant or a tapered cross-sectional profile along its length. Alternatively, the exterior surface may comprise a corrugated surface portion having a plurality of ridges and grooves. The ridges and grooves may extend in the second circumference direction and/or in the length direction. The exterior surface may further comprise a thickened portion extend from the local root end. The thickened portion may transform into the planar or corrugated portion along an intermediate portion. This enhances the pull-out strength of the bushing.

At least the planar or corrugated portion may be wrapped in a fibre material comprising fibre made of carbon, glass, aramid or a combination thereof. The fibre material may be formed as rovings or strips. The fibre material extends along the entire second circumference direction. During the resin infusion process, the fibre material may be impregnated with resin and allow resin to flow between the first and second side surfaces. The fibre material may be the same as the fibre material used in the inner or outer skin of the root end structure, or a different fibre material. This further enhances the pull-out strength of the bushing.

The above fibre material may be loosely arranged within the gaps described earlier and/or compressed against the first and second side surfaces. The amount of compression force may vary as a result of the radial distance of the gap. For example, the compression force may be highest in the width direction and lowest in the thickness direction. For example, the compression force may be highest in the width direction and lowest at an angular position between the width and thickness directions. For example, the compression force may be substantially uniform along the second circumference direction.

According to one embodiment, said second side surface has a continuous elliptical profile extending partly or fully along the one second side.

The second side surface of the recess may form a continuous elliptical line segment extending along the respective second side. This line segment may form part of the inscribed elliptical profile mentioned above. The first pultruded element, or at least the respective second side forming the recess, may be formed as a single piece. No obtuse angles are thereby formed along the second side surface.

According to one embodiment, the said second side surface comprises a planar surface portion arranged between two curved, e.g. elliptical or circular, surface portions.

The second side surface may be formed by a number of surface portions arranged relative to each other. The respective surface portions may together form an inscribed substantial elliptical profile. The abovementioned continuous element may form the respective surface portions, alternatively the respective surface portions may be formed by the first and second sub-pieces.

The respective pultruded element may comprise a central surface portion arranged between an inner surface portion and an outer surface portion. The central surface portion may preferably have a planar profile acting as a contact area for the bushing. The inner and outer surface portions may each a curved profile, e.g. elliptical or circular, which may function as stops for that respective first pultruded element and/or the second pultruded element pultruded element when moving in the thickness direction. The surface portions may thus form a first and a second gap extending in the longitudinal direction.

The first side surface of the bushing may contact the central surface portion of the first pultruded element to restrict the relative movement in the width direction. During the resin infusion process, the first pultruded element is able to move relative to the bushings to bring the inner or outer surface portion into contact with or into a closer contact with the first side surface. This allows for an adaptive positioning of the first pultruded elements so that it conforms to the shape of the outer layers.

According to one embodiment, said second side surface comprises at least two planar surface portions arranged at an angle relative to each other.

The central surface portion as well as the inner and outer surface portions may all have a planar profile, thereby forming two opposite facing obtuse angles. The central surface portion, the inner surface portion and the outer surface portion may be formed by the continuous element described earlier.

Alternatively, the first and second sub-pieces may each have a local side surface facing the bushing, wherein the local side surfaces together form the second side surface. The first sub-piece may form the central surface portion and have a planar or curved profile. The second sub-pieces may form the inner and outer surface portions and have a planar or curved profile. For example, the surface portions may all have a planar profile forming two opposite facing obtuse angles. For example, the surface portions may all have a circular arc or elliptical arc profile. For example, the central surface portion may have a planar profile and the inner and outer surface portions may have a curved profile.

The respective surface portions may together form the inscribed substantial elliptical profile. The central surface portion of the first pultruded element may contact the first side surface of the bushing to restrict the relative movement in the width direction. During the resin infusion process, the first sub-piece and at least one of the sets of the second sub-pieces are able move together relative to the bushing to bring one of the second sub-pieces into contact with the first side surface. Alternatively, the second sub-piece may be brought into a closer contact with the first side surface, i.e. increasing the compression force on the fibre material. This allows for an adaptive positioning of the first pultruded elements so that it conforms to the shape of the outer layers.

According to one embodiment, said first profile is a substantial circular, elliptical or polygon cross-sectional profile in the width direction.

The exterior or first side surface of the bushings may form any suitable cross-sectional profile, such as a circular, elliptical or polygonal profile, in the width direction. This allows for an optimal load transfer between the root end structure and the rotor hub. This also allows for an increased bonding area between the first pultruded element and the bushings.

A first gap and a second gap may be formed between the first and second side surfaces. The first and second gaps may extend in the longitudinal direction and further in the second circumference direction. The second circumference direction may be defined by the first side of the bushing or the second side of the respective pultruded element.

The two gaps may be spaced apart by a central contact area extending in the longitudinal direction, or vice versa. The respective pultruded element contact area may be used to form a relative close contact gaps may enable the first pultruded element to move relative to the bushing in the thickness direction. The gaps allow the pultruded element to move relative to the bushings, particularly during the vacuum assisted resin infusion of the root end structure. This in turn allows for a passively adaptive positioning of the pultruded element so that it conforms to the shape of the outer skin, thereby reducing the risk of wrinkles forming in a transitional area between the inner and outer skins. The transitional area is located at the end of the respective pultruded element facing the tip end. The first and second gaps may a tight fit in the transverse plane while allowing relative movement of the pultruded element within the longitudinal plane.

Alternatively, a continuous gap may be formed between the first and second side surfaces. The continuous gap may extend in the longitudinal direction and further in the second circumference direction. The first pultruded element may thus move relative to the bushing in the thickness direction and/or in the width direction. This also allows for an adaptive positioning of the pultruded element, as mentioned above.

The above gap or gaps may a transverse radial distance measured between the first and second side surfaces in the second circumference direction. The transverse radial distance may be constant along the second circumference direction. The local edges between the first side surface, e.g. the recess, and the corresponding second side may be rounded or chamfered to form a smooth transition. This allows for a uniform distribution of resin between the first pultruded element and the bushing.

The radial distance may be tapered off at the respective contact areas, thereby forming a smooth transition between the gap and the contact area. The radial distance may also taper continuously from the respective second side to the contact area. This allows for a gradual limitation of the relative movement in the thickness direction and/or in the width direction.

In a further alternative, the radial distance may vary along the second circumference direction between the second side and the contact area. For example, the radial distance may decrease from at least one intermediate angular position indicating a maximum radial distance to another position indicating a minimum radial distance, e.g. the contact area and/or the second side. This allows for the formation of one or more local resin guiding channels extending in the longitudinal direction. These resin-guiding channels may be party or fully filled with a resin permeable material, e.g. a fibre material.

The radial distance of the gap or gaps may be varied dependent on the root end configuration, the outer dimensions of the bushings, and/or the outer dimensions of the pultruded elements.

The gap or gaps may further have a lengthwise radial distance measured between the first and second side surfaces in the longitudinal direction. The lengthwise radial distance may constant along the longitudinal direction. This also allows for a more uniform distribution of resin with the gap. Alternatively, the lengthwise radial distance may vary in the longitudinal direction, e.g. taper from one end to the opposite end. This may restrict the rotational movement of the first pultruded element relative to the bushing in order to ensure that the pultruded element conforms to the shape of the outer skin.

One object of the invention is also achieved by a wind turbine blade, the wind turbine blade extending from a blade root to a tip end in a longitudinal direction and further from a leading edge to a trailing edge in a chordwise direction, the wind turbine blade comprising a blade shell formed by at least two blade parts each having an inner surface and an outer surface, wherein said at least two blade parts are connected along at least one blade joint interface extending in the longitudinal direction, each blade joint interface is defined by a first blade joint edge of one blade part and a second blade joint edge of the other blade part, wherein at least one of said two blade parts comprises a root end structure configured as described above.

This provides a wind turbine blade with an improved root end structure as described above. The above described root end structure reduces the risk of wrinkles forming in the transitional skin area at the ends of the pultruded elements. The gaps between the pultruded elements and the bushings ensure that the pultruded elements follow the shape of the outer skin during the vacuum assisted resin infusion. The time and costs for repairing wind turbine blades having a blade length of at least 50 metres can thus be reduced compared to conventional methods.

The wind turbine blade is formed by at least two blade parts each defining a pressure side and a suction side of the blade shell. The blade shell of each blade part has an inner surface defined by the inner layers and an outer surface defined by the outer layers. The two blade parts are jointed together at blade joint interfaces located at the trailing edge and the leading edge, respectively. Each joint interface comprises a first blade joint edge of one blade part and a second blade joint edge of the other blade part. The blade parts may further be jointed together via shear webs or a box beam located between the trailing edge and the leading edge.

One object of the invention is further achieved by a method of manufacturing a wind turbine blade, comprising the steps of:
laying up a number of outer layers of a fibre material along a blade mould surface,
providing a plurality of fastening members configured to mount the wind turbine blade to a rotor hub interface or a pitch bearing unit,
positioning said fastening members relative to said outer layers at a root end of said wind turbine blade,
positioning a first pultruded element between at least one pair of fastening members and, optionally, positioning a second pultruded element between an outermost fastening member and a blade joint edge of the at least one blade part,
further laying up a number of inner layers of the fibre material along the first pultruded element and the fastening members to form a root end structure,
enclosing at least the root end structure via a vacuum bag material,
introducing resin into said fibre material using vacuum assisted resin infusion process,
curing said resin to form a cured blade part, wherein said first pultruded element is able to move relative to the fastening members during the vacuum assisted resin infusion process.

This provides a manufacturing method that allows for adaptive positioning of the pultruded elements when injecting resin into the root end structure. The above root end structure is particular suited for vacuum assisted resin infusion as the pultruded elements are able to passively conform to the outer skin during evacuation of the root end structure.

The wind turbine blade may be manufactured by laying up a number of outer layers along a blade mould surface, wherein these outer layers extend further along a mould edge surface.

The bushings may be mounted to a suitable holding structure, e.g. a root end plate, separate from the blade mould. The first pultruded elements may then be positioned in between the individual bushings to ensure a mutual spacing between the bushings. Optionally, a second pultruded element may be positioned at the blade joint ends. This may be done in a combined step, or in separate steps. The holding structure with bushings and first pultruded elements may then be moved into position relative to the root end of the outer layers and fixed relative to the blade mould. Afterwards, a number of inner layers are laid up along the local inner surfaces of the bushings and/or the first pultruded elements, wherein these inner layers extend over the outermost bushings or pultruded elements and further along the mould edge surface.

A vacuum bag material is then placed over the root end structure and resin is introduced using a suitable vacuum assisted resin transfer moulding (VARTM) system. During the resin infusion, the first pultruded elements are able to adapt to the shape of the outer layers to compensate for any longitudinal misalignments. The resin is set to cure to form a cured blade part. The process is repeated for the other blade part.

Excess lengths of the inner and outer layers may then be trimmed off at the blade joint ends prior to moving the two blade parts into alignment. The two blade parts may then be joined together at the blade joint interface to form the wind turbine blade.

According to one embodiment, the positioning of the first pultruded element comprises arranging one sub-piece between the pair of adjacent fastening members and further arranging at least one set of further sub-pieces relative to said one sub-piece at a local inner or outer side.

The first pultruded element may be formed as continuous element allowing for an optimal load transfer. The first pultruded element may thus be positioned between a pair of adjacent bushings in a simple and easy manner.

Alternatively, a first sub-piece may be initially positioned between the pair of adjacent bushings. Afterwards, a second sub-piece or a set of second sub-pieces may be positioned at the inner surface relative to the first sub-piece. The second sub-pieces may partly or fully fill up out any spacing between the adjacent bushings and the first sub-piece, thereby providing a substantially smooth inner surface. The sub-pieces allows for an easier handling.

Additionally or alternatively, another second sub-piece or another set of second sub-pieces may be positioned at the outer surface relative to the first sub-piece. These second sub-pieces may also partly or fully fill up out any spacing between the adjacent bushings and the first sub-piece, thereby providing a substantially smooth outer surface. This may be performed before, during or after the positioning of the first sub-piece.

According to one embodiment, the method further comprises at least the step of:
- wrapping one of said adjacent fastening members and/or one of said one sub-piece and said further sub-pieces in another fibre material, or
- placing another fibre material between a first side surface of the fastening member and a second side surface of the first pultruded element.

The exterior surface of the individual bushings may be partly wrapped in a fibre material prior to be positioned between the bushings. The bushings may thus be provided as prewrapped fastening members.

Additionally or alternatively, one or more of the second sub-pieces together with the bushing may be further wrapped with one or more layers of a fibre material to form a wrapped unit. The remaining of the second sub-pieces may then be positioned after this wrapped unit have been positioned between the bushings. Optionally, all second sub-pieces are wrapped together with the bushing to the wrapped unit. This provides a simple and easy positioning of the respective sub-pieces as the first sub-piece and any remaining second sub-pieces can simply be positioned between these wrapped units.

Additionally or alternatively, another fibre material may be placed over the inner surface of each individual bushing or weaved in between the individual bushings before positioning the first pultruded elements or sub-pieces. This allows resin to flow in between the pultruded elements and the bushings to enhance the pull-out strength.

DESCRIPTION OF DRAWINGS

The invention is explained in detail below with reference to embodiments shown in the drawings, in which
FIG. 3 shows an exemplary embodiment of a root end structure,
FIG. 4 shows a cross-sectional view of a first embodiment of the root end structure placed in a blade mould,
FIG. 5 shows a cross-sectional view of a second embodiment of the root end structure placed in the blade mould,
FIG. 6 shows a third embodiment of the second pultruded element,
FIGS. 7a-c show three views of a fourth embodiment of the second pultruded element,
FIG. 8 shows a fifth embodiment of the second pultruded element,
FIGS. 9a-b show two views of a sixth embodiment of the second pultruded element,
FIG. 10 shows a side view of the fastening member,
FIG. 11 shows a side view of a first embodiment of the first pultruded element,
FIG. 12 shows a side view of a second embodiment of the first pultruded element,
FIG. 16 shows a sixth embodiment of the first pultruded element,
FIGS. 17a-b show two views of the root end structure comprising a seventh embodiment of the first pultruded element,
FIG. 18 shows a longitudinal view of the root end structure with a misalignment between the outer layers and the first pultruded element.

LIST OF REFERENCES

Figure 1:
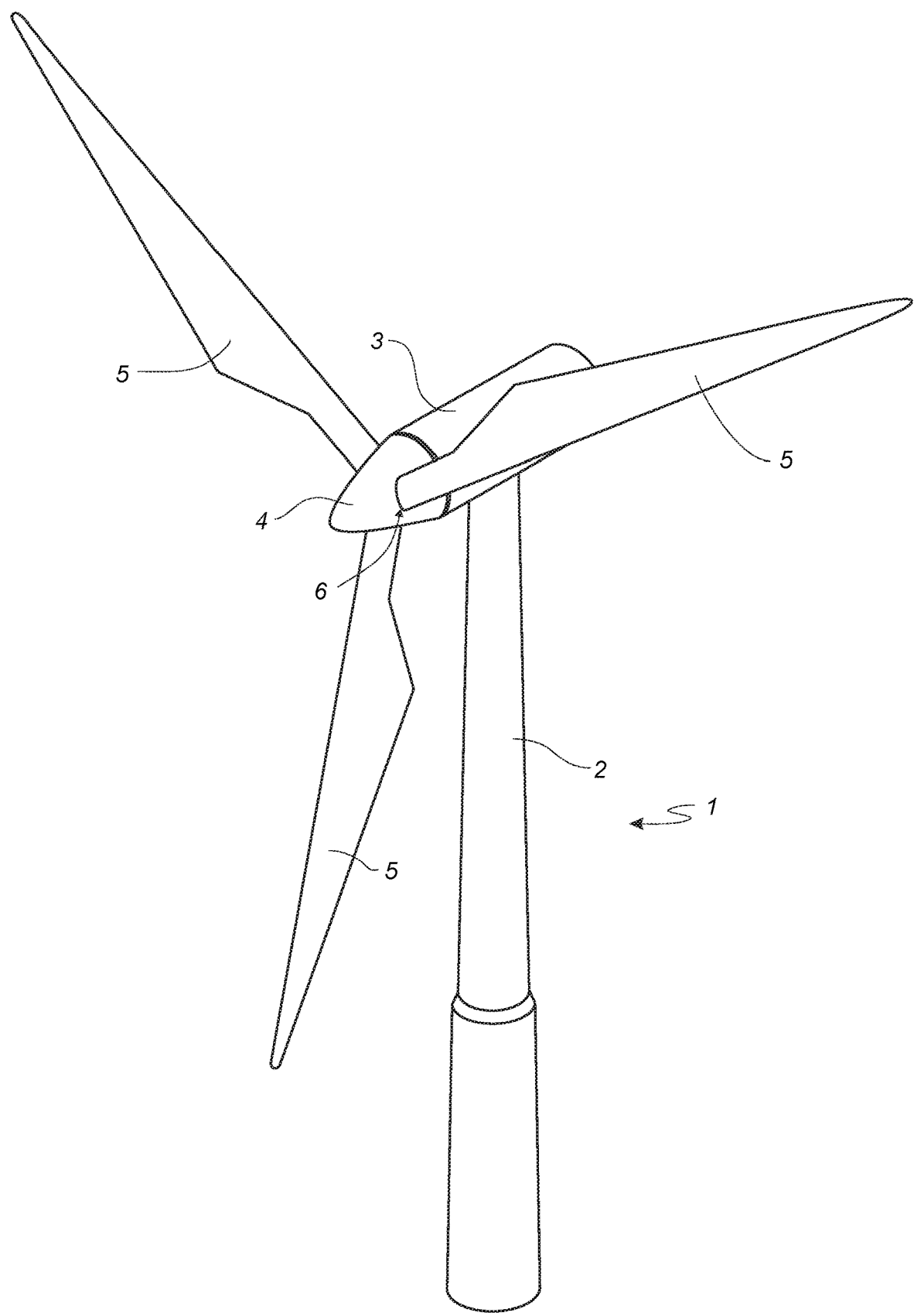
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Root end structure
20a. First blade joint edge
20b. Second blade joint edge
21. Inner surface
22. Outer surface
23. Fastening members, bushings
23a. Outermost fastening member, bushing
24. Blade mould
25. Blade mould surface
26. Mould edge surface
27. First pultruded element, retaining member
27a-b. First and second portions
28. Second pultruded element, retaining member
28a-c. First, second and third sub-pieces
29. Inner layers
30. Wrinkles
31. Transition portion
32. Transitional contact surface
33a-b. Local second sides
34. Local inner side
35. Local outer side
36. Recess
37. Inner point
38. Second side surface
39. Local inner side
40. Local outer side
41a-b. Local first sides
42. Outer layers
43. Gap
44. First side surface
45. Contact area 46. First sub-piece
47. Second sub-piece
48. Wrinkles
49. Spacer elements The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the number of blades may be greater or smaller. The hub 4 is connected to a drive train located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
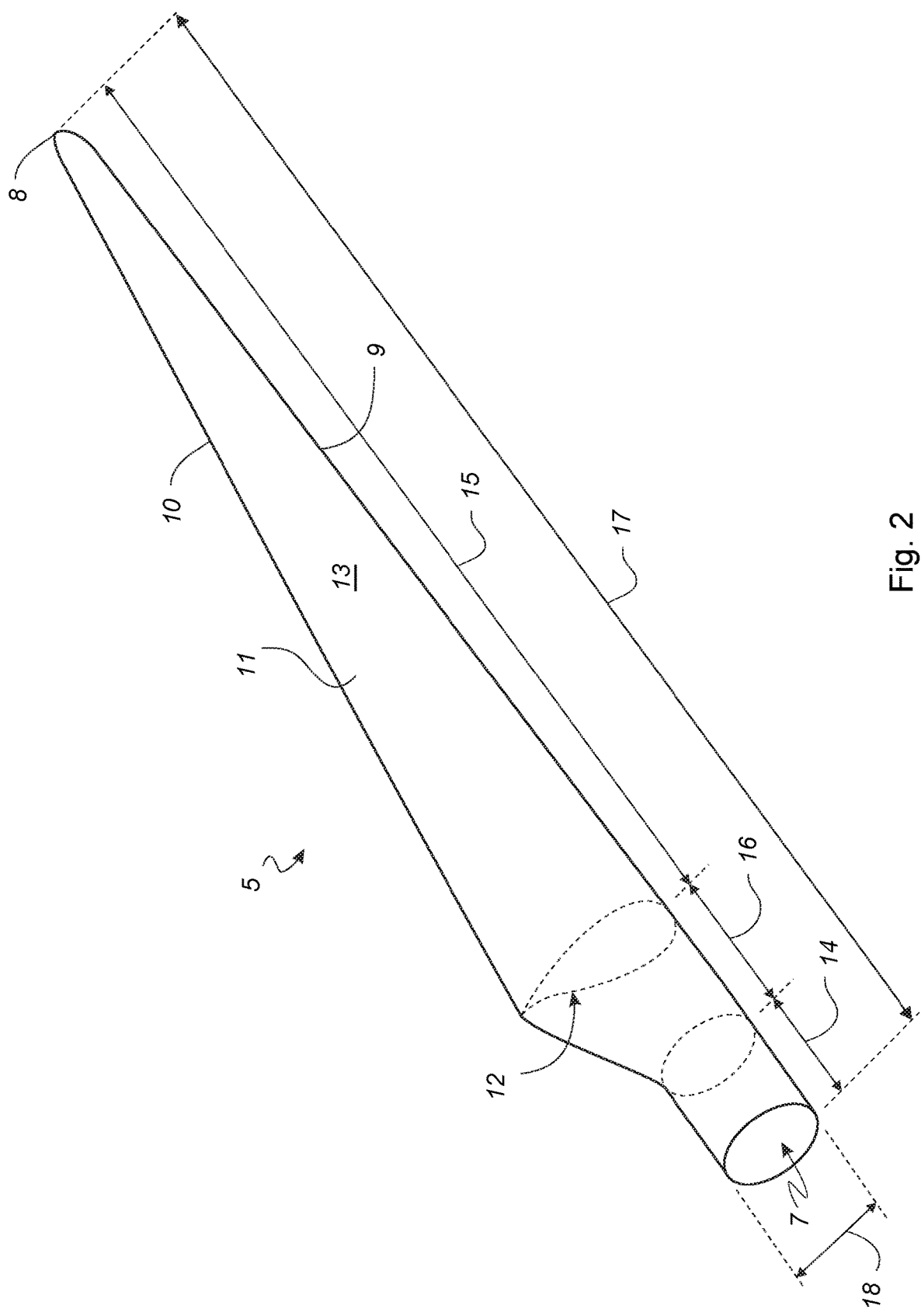
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a root portion 14, an aerodynamic portion 15, and a transition portion 16 between the root portion 14 and the aerodynamic portion 15.

The root portion 14 has a substantially circular or elliptical cross-section (indicated by dashed lines). The root portion 14 together with a load carrying structure (not shown) are configured to add structural strength to the wind turbine blade 5 and transfer the dynamic loads to the hub 4. The load carrying structure extends between the pressure side 12 and the suction side 13 and further in the longitudinal direction.

The aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a longitudinal length 17 of at least 35 metres, preferably at least 50 metres. The wind turbine blade 5 further has a chord length 18 as function of the length 17, wherein the maximum chord length is found between the aerodynamic portion 15 and the transition portion 16. The wind turbine blade 5 further has a blade thickness as function of the chord length 18, wherein the blade thickness is measured between the pressure side 12 and the suction side 13.

FIG. 3 shows an exemplary embodiment of a root end structure 19 formed by two blade parts where one blade part comprises two first blade joint edges 20a and the other blade part comprises two second blade joint edges 20b. The blade joint edges 20a, 20b extend in the longitudinal direction and, when joined together, the first and second blade joint edges 20a, 20b form a leading edge joint interface and further a trailing edge interface.

The blade shell 11 of the root end structure 19 forms an inner surface 21 and an outer surface 22. A plurality of fastening members 23 are distributed along the root end 7 in a first circumference direction. A plurality of retaining members (shown in FIGS. 4 and 5) are arranged relative to each of the fastening members 23, wherein the fastening members 23 and the retaining members are sandwiched between a number of inner layers (shown in FIGS. 18-19) and a number of outer layers (shown in FIGS. 18-19).

FIG. 4 shows a cross-sectional view of the root end structure 19 placed in a blade mould 24. The blade mould 24 has a blade mould surface 25 having a predetermined surface profile and a mould edge surface 26.

The outer layers (shown in FIGS. 18-19) extend along the blade mould surface 26 and further along the mould edge surface 25 during the lay-up, but are removed in FIGS. 4 and 5 for illustrative purposes. The outer layers form an outer skin of the blade shell 11 defining the outer surface 22.

The fastening members 23 are here formed as bushings each arranged between a pair of adjacent retaining members. The retaining members are here formed as pultruded elements. A first pultruded element 27 is arranged between a pair of adjacent bushings 23 while an outermost bushing 23a is arranged between a first pultruded element 27 and a second pultruded element 28.

The first pultruded element 27 may be formed as a single continuous element, or by a number of sub-pieces. Here, two symmetrical sub-pieces are shown which are arranged back-to-back, as indicated by the dashed line. The first pultruded element 27 has a butterfly shaped cross-sectional profile in the width direction.

The second pultruded element 28 has a semi-butterfly shaped cross-sectional profile in the width direction. The second pultruded element 28 is arranged at the first and/or second blade joint edge 20a, 20b. FIG. 4 shows a prior art embodiment of the second pultruded element 28 where a sharp transition is formed between the second side surface (see FIG. 6) and the second inner surface (see FIG. 6). Wrinkles 30 are thus formed in the inner layers 29 at the blade joint edge 20a, 20b due to this sharp transition.

During lay-up, the inner layers 29 extend along the local inner sides (shown in FIGS. 6 and 16) of the first pultruded elements 27, over the second pultruded element 28 and further along the mould edge surface 25. Excess material of the inner 29 and outer layers are trimmed off after curing. The inner layers 29 form an inner skin of the blade shell 11 defining the inner surface 21.

FIG. 5 shows a cross-sectional view of the root end structure 19 still placed in the blade mould 24, wherein the root end structure 19 comprises a first embodiment of the second pultruded element 28'.

Here, the second pultruded element 28' comprises a transition portion 31 forming a transitional contact surface 32 for contacting the inner layers 29. The local thickness of this transition portion 31 tapers towards the second side surface (see FIG. 6) facing the blade joint edge 20a, 20b. The local width of the transition portion 31 further tapers towards the second inner side (shown in FIG. 6). The transitional contact surface 32 forms a smooth transition of the inner layers 29, thereby reducing the risk of wrinkles 30.

FIG. 6 shows a second embodiment of the second pultruded element 28', wherein the transition portion 31' extend along the entire width of the second pultruded element 28'. The local thickness tapers from one second side 33a to an opposite second side 33b.

Here, the transition portion 31' extends along the entire local inner side 34 of the second pultruded element 28' and partly along the local second side 33b. The transition port 31' may extend fully along both the local inner side 34 and the local second side 33b. The transition port 31' may also extend partly along both the local inner side 34 and the local second side 33b, as indicated in FIG. 5.

The second pultruded element 28' further has a local outer side 35 facing the outer layers.

A recess 36 is formed in the local second side 33a of the second pultruded element 28 and in both local second sides 33a, 33b of the first pultruded element 27. The recesses 36 are configured to partly receive the outermost bushing 23a, as indicated in FIG. 4. The recess 36 may extend partly along the local second side 33a, as indicated in FIG. 6, or alternatively along the entire local second side 33a.

FIGS. 7a-c show three views of a third embodiment of the second pultruded element 28″, wherein the profile of the second pultruded element 28', 28″ is terminated at the local inner side 34 or at an inner point 37 forming an inner edge.

In FIG. 7a, the transitional contact surface 32' has a planar surface profile which extends perpendicularly from the local outer side 35. The transitional contact surface 32' intersects a second side surface 38 of the local second side 33a, thereby forming a reduced recess 36' for receiving the outermost bushing 23a. The recess 36 may have a semi-circular shaped profile while the recess 36' may have circular segment shaped profile. The inner layers 29 may thus contact a portion (dashed line) of the outer surface of the outermost bushing 23a, as indicated in FIG. 7a.

In FIG. 7b, the transitional contact surface 32″ has a curved profile extending from the local outer side 35 to the inner point 37. In FIG. 7c, the transitional contact surface 32' has a planar surface profile which extends in an inclined angle relative to the local outer side 35.

FIG. 8 shows a fourth embodiment of the second pultruded element 28‴ comprises a number of sub-pieces which together form a substantial semi-butterfly shaped cross-sectional profile in the width direction. A first sub-piece 28a extends in the thickness direction and a set of second sub-pieces 28b projects from a side surface of the first sub-piece 28a. Here, a second sub-piece 28b is arranged at both the local inner and outer sides 34, 35.

The individual sub-pieces 28a, 28b together form the recess 36 for partly receiving the outermost bushing 23a.

FIGS. 9a-b show two views of a fifth embodiment of the second pultruded element 28‴, wherein the transition portion 31″ is integrally formed by one of the sub-pieces 28a-c.

In FIG. 9a, the first sub-piece 28a' has a substantial rectangular profile in the width direction, wherein the transition portion 31″ is facing the local inner side 34. The second sub-pieces 28b have a substantial triangular profile in the width direction.

In FIG. 9b, the first sub-piece 28a″ extends in the width direction and has a substantial parallelogram shaped profile. Here, the transition portion 31″ form one end of the first sub-piece 28a″. The second sub-pieces 28b' extends in the thickness direction and has a substantial rectangular profile in the width direction. Further, a third sub-piece 28c projects from a side surface of the second sub-piece 28b and has a substantial triangular profile in the width direction.

FIG. 10 shows a side view of the fastening member 23, 23a having a predetermined length measured between a local root end 7' and an opposite end. Here, the fastening member 23, 23a has a uniform cross-sectional profile in the length direction. However, the cross-sectional profile may instead vary or taper along the length. As indicated in FIGS. 4-5, the fastening member 23, 23a has a circular cross-sectional profile. However, the fastening member 23, 23a may another suitable cross-sectional profile, such as an elliptical or polygonal profile. The fastening member 23, 23a thus has a uniform or variable outer diameter or thickness along its length.

Figure 13:
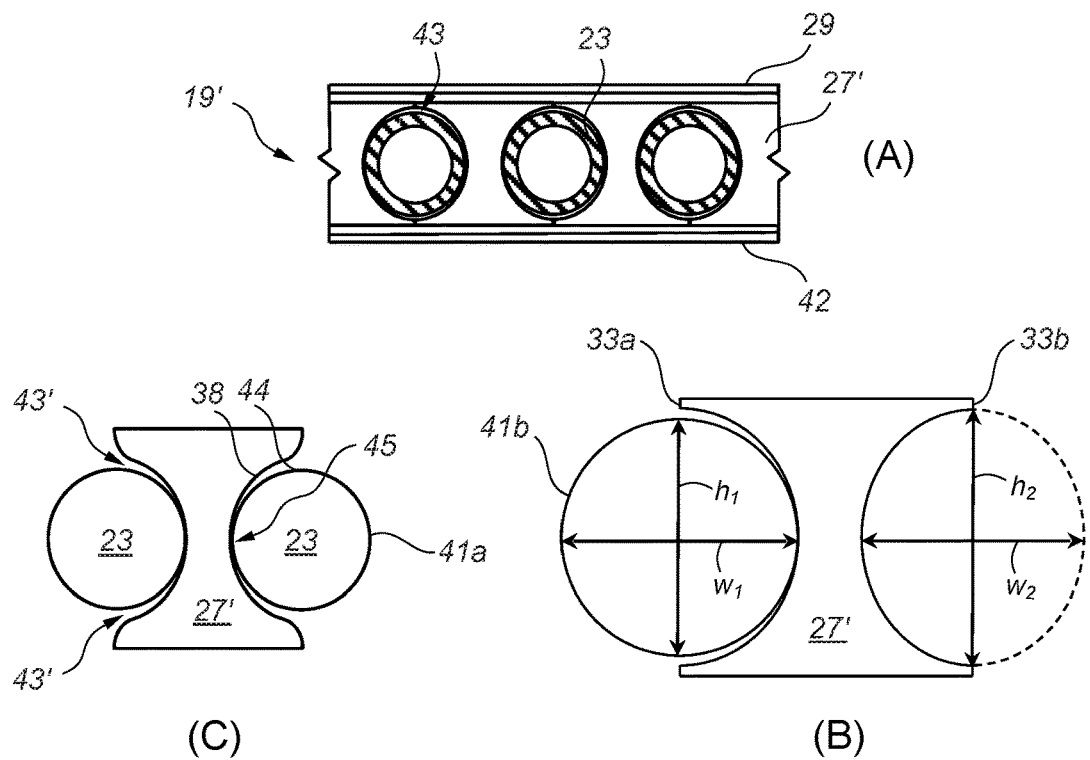
FIGS. 13a-c show three views of the root end structure comprising a third embodiment of the first pultruded element.

The fastening member 23, 23a has a local inner side 39, a local outer side 40 and two opposite facing local first sides, as indicated in FIG. 13b-c. Here, only one local first side 41a is show.

The exterior surface of the fastening member 23, 23a is optionally wrapped in a fibre material, as indicated with dashed lines, wherein the wrapped fibre material extends along at least a part of the length of the fastening member 23, 23a.

FIGS. 11-12 show a side view of a first and a second embodiment of the first pultruded element 27 comprising a first portion 27a and a second portion 27b. The first portion 27a extends from a local root end 7″ towards an opposite end while the second portion 27b extends from the first portion 27a to said opposite end.

Figure 19:
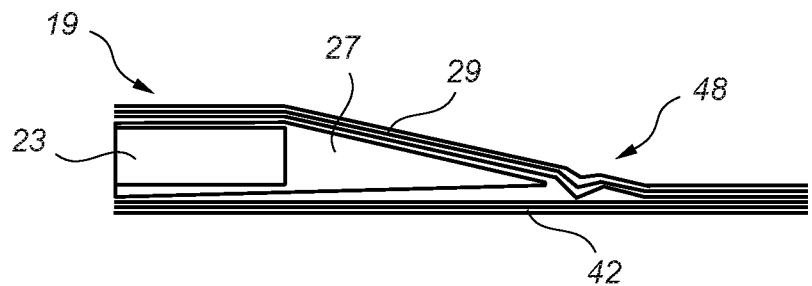
FIG. 19 shows a longitudinal view of the root end structure with the first pultruded element conforming to the shape of the outer layers.

The first portion 27a has a uniform thickness along its local length, as indicated in FIGS. 11-12. The local length of the first portion 27a corresponds substantially to the length of the fastening member 23, 23a, as indicated in FIGS. 18-19.

The second portion 27b has a tapered profile extending beyond the fastening member 23, 23a where the local thickness tapers from a maximum thickness to a minimum thickness. As indicated in FIG. 11, the first and second portions 27a, 27b may form a continuous local outer side 35 where the second portion 27b tapers from the inner side 34 to the local outer side 35. As indicated in FIG. 11, the second portion 27b may form inclined local inner and outer sides 34, 35 where the second portion 27b tapers towards a local central line.

The second pultruded element 28 has a similar configuration as the first pultruded element 27 shown in FIGS. 11-12.

FIGS. 13a-c show three views of the root end structure 19' comprising a third embodiment of the first pultruded element 27'. FIGS. 13b-c show a simplified view of one first pultruded element 27' where the local first sides 41a, 41b of a pair of adjacent bushings 23 extend into the local second sides 33a, 33b of the first pultruded bushing 27'.

Figure 14:
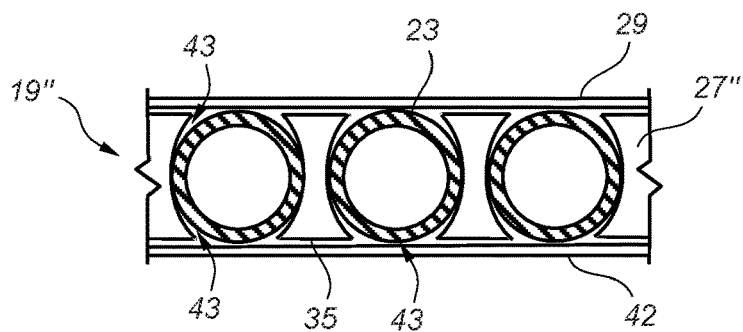
FIG. 14 shows the root end structure comprising a fourth embodiment of the first pultruded element.

The first pultruded element 27' has a thickness greater than the outer diameter of the fastening member 23. The inner layers 29 extend along the local inner sides 34 and the outer layers 42 extend along the local outer sides 35 of the first pultruded elements 27'. The local second sides 33a, 33b of a pair of adjacent first pultruded elements 27' may contact each other, as indicated in FIG. 13a, or be spaced apart, as indicated in FIG. 14.

A number of gaps 43 are formed between a first side surface 44 of the bushing 23 and the second side surface 38 of the first pultruded element 27'. Here, a first gap 43' and a second gap 43' are formed on opposite sides of the bushing 23. The first and second gaps 43' extend in the longitudinal direction and further along a second circumference direction defined by the second side surface 38.

Here, the second side surface 38 has an elliptical arc profile while first side surface 44 has a circular profile. The second side surface 38 and the adjacent local side surfaces may form a sharp transition, as indicated in FIG. 13b, or a smooth transition, as indicated in FIG. 13c.

The elliptical arc profile of the second side surface 38 forms part of an inscribed profile having a predetermined height, $h_2$, and width, $w_2$, as illustrated in FIG. 13b. The height, $h_2$, being greater than the width, $w_2$, where the major radius (indicated by arrow) may be located at the second side 33b (FIG. 13b) or beyond the second side 33b (FIG. 18b).

Further, the circular profile of the first side surface 44 forms part of a circumscribed profile having a predetermined height, $h_1$, and width, $w_1$, as also illustrated in FIG. 13b. The height, $h_1$, being equal to the width, $w_1$, where the major radius (indicated by arrow) may be located at the second side 33a (FIG. 13b) or beyond the second side 33a (FIG. 18a).

Here, the first pultruded element 27' contacts the adjacent bushings 23 at a contact area 45 formed on the second side surface 38, as indicated in FIGS. 13b-c. The first and second gaps 43' has a radial distance that varies along the second side surface 38, as indicated in FIGS. 13a-c. This allows for an adaptive positioning of the first pultruded element 27' in the longitudinal direction.

FIG. 14 shows the root end structure 19" comprising a fourth embodiment of the first pultruded element 27" where the first pultruded element 27" has a local thickness smaller than the outer diameter of the bushings 23. The inner and outer layers 29, 42 are here contacting both the local inner sides 35 of the first pultruded elements and the local inner sides 43 of the bushings 23.

Figure 15:
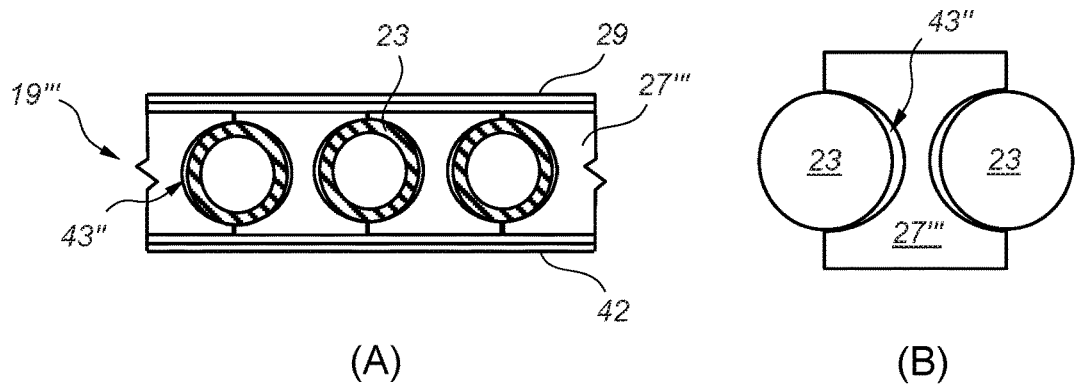
FIGS. 15a-b show two views of the root end structure comprising a fifth embodiment of the first pultruded element.

FIGS. 15a-b show two views of the root end structure 19''' comprising a fifth embodiment of the first pultruded element 27'''. FIG. 15b shows a simplified view of one first pultruded element 27''' where a pair of adjacent bushings 23 extends partly in the recesses 36 formed in the first pultruded bushing 27'''.

Here, a central gap 43" is formed between the first and second side surfaces 38, 44 wherein the radial distance varies along the first circumference direction. A first contact area 45' and a second contact area 45" are further formed between the first and second side surfaces 38, 44 where the bushings 23 are contacting the pultruded element 27''' at these first and second contact areas 45". This allows for an adaptive positioning of the first pultruded element 27''' in the width direction.

Here, the second side surface 38 has an alternative elliptical arc profile and the first side surface 44 has a circular profile.

FIGS. 16a-b show a sixth embodiment of the first pultruded element 27'''' where the second side surface of the recesses 36 comprises a planar surface portion 38' arranged between two curved surface portions 38". The curved surface portions 38" may be shaped as a circular arc segments, as indicated in FIG. 16a. The inner arc segment has a first radius, $r_1$, and outer arc segment has a second radius, $r_2$. The first and radiuses $r_1$, $r_2$ have the same or different values.

The curved surface portions 38" may also be shaped as elliptical or super-elliptical arc segments, as indicated in FIG. 16b. The two elliptical arc segments have the same or different major and minor radiuses.

The planar surface portion 38' functions as contact areas for contacting the bushings 23. Unlike the embodiments of FIGS. 15 and 17, the gaps 43 can be formed while maintaining a minimum width between the recesses 36 in the width direction, as indicated by dashed lines in FIG. 16a.

FIGS. 17a-b show three views of the root end structure 19'''' comprising a seventh embodiment of the first pultruded element 27''''' where a continuous gap 43''' is formed between the first and second side surfaces 38, 44.

The gap 43''' has a uniform radial distance along the second side surface 38, as indicated in FIG. 17b. The second side surface 38 may have a circular arc profile with an equal height, $h_w$, and width, $w_w$, and the first side surface 44 may further have a circular profile with an equal height, $h_b$, and width, $w_b$, as indicated in FIG. 17b. The first and second side surfaces 38, 44 may also have an elliptical arc profile, as indicated in FIG. 17c. The first and second side surfaces 38, 44 have a common centre point, but different radiuses. This increases the flexibility of the adaptive positioning of the first pultruded element 27'''''.

Here, the bushings 23 are not in a firm and close contact with the first pultruded element 27''''' as the first pultruded element 27''''' is able to move to relative to the bushings in both the thickness direction and in the width direction.

FIGS. 18a-b shows a further alternative embodiment of the first pultruded element 27. Here, the first pultruded element 27 is formed by a number of sub-pieces are arranged relative to each other.

A first sub-piece 46 having a rectangular cross-sectional profile in the width direction is arranged between a pair of adjacent bushings 23. A first set of second sub-pieces 47 is arranged at the local inner side 34 and a second set of second sub-pieces 47 is arranged at the local outer side 35. The individual second sub-pieces 47 of each set are positioned on opposite facing sides of the first sub-piece 46.

In conventional root end design, as indicated in FIG. 18a, all the first and second sub-pieces 46, 47 are contacting the bushing 23 to prevent any relative movements. The first and second sub-pieces 46, 47 together form an inscribed circular profile having equal height and width.

In the present invention, as indicated in FIG. 18b, only the first sub-piece 46 is contacting the bushing 23 and the second sub-pieces 47' are spaced apart from the bushing 23 to form the gaps 43. The first and second sub-pieces 46, 47' together form an inscribed substantial elliptical profile having a height, h", that is greater than its width, w". Here, the bushing 23 forms a circumscribed circular profile having a height, h', and a width, w', of equal values. This also allows for an adaptive positioning of the first pultruded elements 27 in the longitudinal direction.

FIG. 19 shows a longitudinal view of the root end structure 19 with a misalignment between the outer layers 42 and the first pultruded element 27 in the longitudinal direction. This misalignment results in wrinkles 48 forming in the transition area between the inner and outer layers 29, 42.

This misalignment may occur when evacuating the root end structure 19 during the vacuum assisted resin infusion process.

Figure 20:
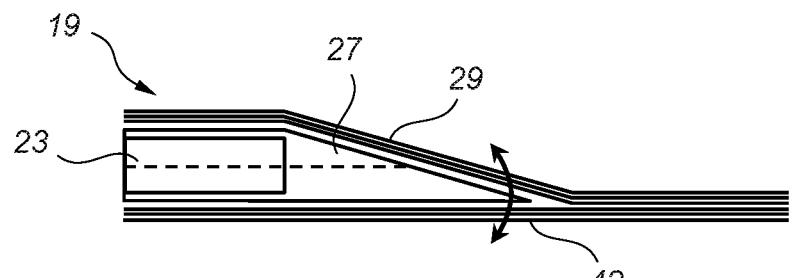
FIG. 20 shows a transverse view of the root end structure with the first pultruded element arranged between a pair of adjacent fastening members.

FIG. 20 shows a longitudinal view of the root end structure 19 with the first pultruded element 27 conforming to the shape of the outer layers 42. This is achieved by providing one or more gaps 43 between the first and second side surfaces 38, 44. The gaps 43 in turn enable the first pultruded element 27 to move relative to the bushings 23 (indicated by arrow) during the vacuum assisted resin infusion. Thereby, allowing the first pultruded elements 27 to passively adapt its longitudinal position relative to the outer layers 42 during the vacuum assisted resin infusion.

Figure 21:
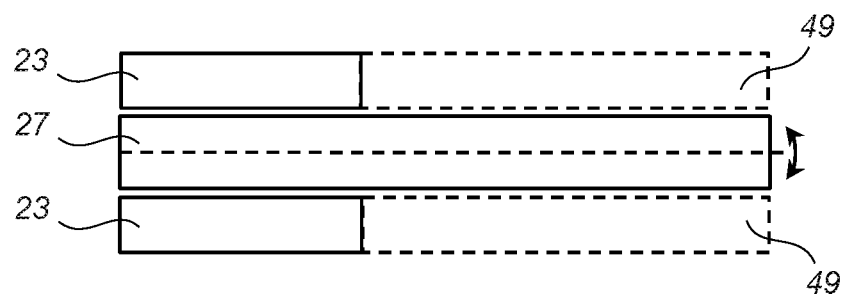
FIG. 21 shows a transverse view of the root end structure with the first pultruded element arranged between a pair of adjacent bushings.

FIG. 21 shows a transverse view of the root end structure 19 with the first pultruded element 27 arranged between a pair of adjacent bushings 23.

Here, the first pultruded element 27 is prevented from moving within the width plane (indicated by arrow) relative to the bushings 23 and spacer elements 49 while being able to move relative to the bushings 23 in the thickness plane, as indicated in FIG. 20.

The spacer elements 49 are positioned relative to the bushings 23 and extend further in the longitudinal direction. The spacer element 49 has a length substantially corresponding to the local length of the second portion 27b of the first pultruded element 27. The spacer element 49 has a tapered profile in the longitudinal direction corresponding to the tapered profile of the second portion 27b. The abovementioned gaps 43, optionally, extend along the length of the bushings 23 and further along at least a part of the length of the spacer element 49.

The abovementioned embodiments may be combined in any combinations without deviating from the present invention.

The invention claimed is:

1. A method of manufacturing a wind turbine blade, comprising the steps of:
   laying up a number of outer layers (44) of a fibre material along a blade mould surface (26),
   providing a plurality of fastening members (23) configured to mount the wind turbine blade (5) to a rotor hub interface or a pitch bearing unit,
   positioning said fastening members (23) relative to said outer layers (44) at a root end (7) of said wind turbine blade,
   positioning a first pultruded element (27) between at least one pair of fastening members and positioning a second pultruded element (28') between an outermost fastening member and a blade joint edge of the at least one blade part, wherein a first side surface of each of the fastening members of the at least one pair of the fastening members and a second side surface of the first pultruded element (27) have non-complementary shapes with respect to one another,
   further laying up a number of inner layers (29) of the fibre material along the first pultruded element (23) and the fastening members (23) to form a root end structure (19),
   enclosing at least the root end structure (19) via a vacuum bag material,
   introducing resin into said fibre material using a vacuum assisted resin infusion process, and
   curing said resin to form a cured blade part,
   wherein said first pultruded element (27) is able to move relative to the fastening members (23) during the vacuum assisted resin infusion process.

2. The method according to claim 1, wherein the positioning of the first pultruded element (27) comprises arranging one sub-piece (46) between said at least one pair of fastening members (23) and further arranging at least one set of further sub-pieces (47) relative to said one sub-piece (46) at a local inner or outer side (34, 35) of the one sub-piece (46).

3. The method according to claim 2, wherein the method further comprises at least the step of:
   wrapping one of said fastening members (23) and/or one of said one sub-piece (46) and said further sub-pieces (47) in another fibre material, or
   placing another fibre material between a first side surface (44) of the fastening member (23) and a second side surface (38) of the first pultruded element (27).

4. The method according to claim 1, wherein each of the first and second pultruded elements (27, 28') has a second inner side (34), a second outer side (35) and opposite facing second sides (33a, 33b) further extending in a longitudinal direction, wherein a first side surface (44) of each of the fastening members (23) of the at least one pair of the fastening members (23) forms a circumscribed profile having a first width ($w_1$) and a first height ($h_1$), and a second side surface (38) of said first and second pultruded elements (27, 28') forms an inscribed profile having a second width ($w_2$) and a second height ($h_2$), the inscribed profile being a substantially elliptical profile,
   wherein said inscribed profile has a first width-to-height ratio ($w_2/h_2$) and said circumscribed profile has a second width-to-height ratio ($w_1/h_1$), the second width-to-height ratio being different from the first width-to-height ratio, and/or
   said inscribed profile and said circumscribed profile have a height ratio ($h_1/h_2$) between 0.8 and 0.95.

5. The method according to claim 4, wherein said first and second side surfaces (38, 44) further has a width ratio ($w_1/w_2$) between 0.8 and 1.

6. The method according to claim 1, wherein said inscribed profile has a first width-to-height ratio between 0.9 and 0.995.

7. The method according to claim 4, wherein at least one of the first and second pultruded elements (27, 28') is formed as a single continuous piece or by a number of sub-pieces (46, 47) arranged relative to each other.

8. The method according to claim 7, wherein the fastening member (23) and/or at least one of said sub-pieces (46, 47) are wrapped in a fibre material along at least a part of the length of the fastening member (23) or the at least one sub-piece.

9. The method according to claim 4, wherein said second side surface (38) has a continuous elliptical profile extending partly or fully along one second side (33a, 33b).

10. The method according to claim 4, wherein the said second side surface (38) comprises a planar surface portion (38') arranged between two curved surface portions (38").

11. The method according to claim 10, wherein the two curved surface portions (38") each have an elliptical curvature.

12. The method according to claim 10, wherein the two curved surface portions (38") each have a circular curvature.

13. The method according to claim 4, wherein said second side surface (38) comprises at least two planar surface portions arranged at an angle relative to each other.

14. The method according to claim 4, wherein said first side surface (44) has a substantial circular, elliptical or polygon cross-sectional profile in the width direction.

* * * * *